United States Patent [19]

Beeman, Jr.

[11] Patent Number: 5,480,162
[45] Date of Patent: Jan. 2, 1996

[54] AXIAL LOAD CARRYING BRUSH SEAL

[75] Inventor: Bruce I. Beeman, Jr., Lake Worth, Fla.

[73] Assignee: United Technologies Corporation, Hartford, Conn.

[21] Appl. No.: 118,159

[22] Filed: Sep. 8, 1993

[51] Int. Cl.⁶ ................................. F16J 15/447
[52] U.S. Cl. .................. 277/53; 60/39.32; 415/174.2
[58] Field of Search ........................ 277/53; 60/39.32, 60/39.31, 752; 415/174.2, 170.1

[56] References Cited

U.S. PATENT DOCUMENTS

| | | | |
|---|---|---|---|
| 3,917,150 | 11/1975 | Ferguson et al. | 277/53 X |
| 4,422,288 | 12/1983 | Steber | 60/39.32 |
| 4,785,623 | 11/1988 | Reynolds | 60/39.32 |
| 5,029,875 | 7/1991 | Spain et al. | 277/53 X |
| 5,071,138 | 12/1991 | Mackay et al. | 277/53 X |
| 5,074,748 | 12/1991 | Hagle | 277/53 X |
| 5,090,710 | 2/1992 | Flower | 277/53 |
| 5,181,728 | 1/1993 | Stec | 277/53 |
| 5,265,412 | 11/1993 | Bagepalli et al. | 60/39.32 |
| 5,289,677 | 3/1994 | Jarrell | 60/39.32 |
| 5,335,920 | 8/1994 | Tseng et al. | 277/53 X |

Primary Examiner—William A. Cuchlinski, Jr.
Assistant Examiner—John L. Beres
Attorney, Agent, or Firm—Norman Friedland

[57] ABSTRACT

A brush seal consisting of a annular backing plate, annular side plate and a bundle of bristles disposed axially sandwiched in between serve to transmit the axial load when assembled and eliminate the necessity of seal retaining mechanism such as split rings or retaining plates. The invention is particularly adapted to seal the interface of the combustor and the stator of the first stage turbine of a gas turbine engine.

4 Claims, 4 Drawing Sheets

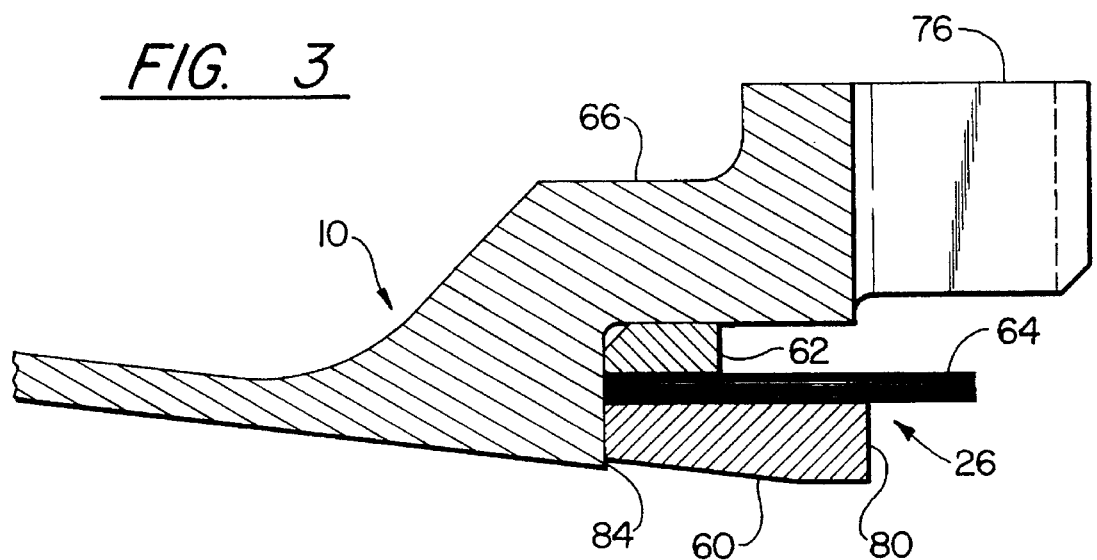
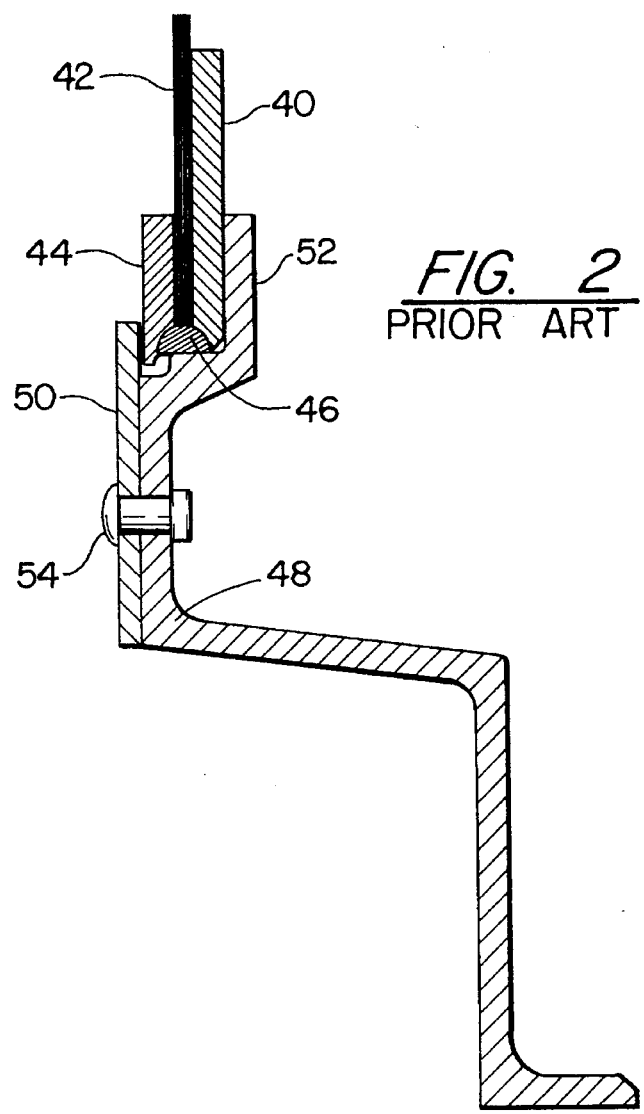

AXIAL LOAD CARRYING BRUSH SEAL

TECHNICAL FIELD

This invention relates to brush seals and particularly to brush seals that are oriented axially and that include means for transmitting axial loads and are suitable to seal the interface of the combustor and stator of the first stage turbine of a gas turbine engine.

BACKGROUND ART

As is well known in the art of brush seals, the seals have been particularly adapted for use in rotating machinery and are constructed with a bundle of fibers that are oriented radially relative to the rotating or stationary part so that the ends cooperate to seal one area of a rotating machine from another. Typically, the brush seal is comprised of a package consisting of a backing plate, bristles, and a side plate. These three components are welded together to form the package. More often than not the bristles are mounted radially and the seal conventionally requires the use of retaining means such as a retaining plate or snap ring to secure the bristle pack to the carrier.

An exemplary brush seal is disclosed in U.S. Pat. No. 5,090,710 granted to R. F. J. Flower on Feb. 25, 1992 entitled "Brush Seal". As noted therein, the brush seal comprises a seal assemble with a plurality of brush seal elements each of which include a generally arcuate carrier and a plurality of bristles projecting therefrom. The brush seal elements are supported end-to-end to form a continuous wiping surface. The patents disclose seven different examples of designs for supporting the brush seal elements.

U.S. Pat. No. 5,074,748 granted to M. P. Hagle on Dec. 4, 1991 entitle "Seal Assembly for Segmented Turbine Engine Structures" discloses a brush seal utilized to seal the cooling passage from the engine's gas path. This disclosure shows a combination of a radial brush seal and spline seal that serves to seal the segmented components of a segmented shroud and segmented turbine rotor assembly where the brush seal provides continuous cicumferential sealing around the segments and spline seals.

The heretofore known brush seals are typically constructed, as is apparent from the prior art, to include means for securing the brush seal to be concentric with the component being sealed by the bristles. Obviously, when the bristles are mounted in the radial direction the axial loadings have virtually no affect on the bristles. However when the bristles are mounted in the axial direction the axial loads are of paramount consideration. In static structures, as for example, in the interface between the combustor and the first stator of the gas turbine engine, which is a hostile environment, the axial loads are extremely high as a result of large component displacements.

Obviously, in this environment where it is necessary to separate the cool air stream from the gas path so that neither leaks into the other, the engine designer is confronted with a complex problem. The consequence of any leakage at this juncture point particularly after considerable work has been expended on the fluid working medium is a substantial penalty which ultimately affects engine performance.

I have found that I can provide a satisfactory seal at this interface by utilizing an axial load carrying brush seal that eliminates the need for a retaining plate or snap ring as is required in heretofore known designs. The use of a diametral tight fit between the side plate and carrier holds the brush seal package in place without requiring the retaining or snap ring. The brush seal package backing plate serves a dual function of supporting the bristle pack and transmitting the axial loads between components.

SUMMARY OF THE INVENTION

An object of this invention is to provide an improved brush seal that is characterized as simple in construction and to assemble in its environment and that eliminates the need of retaining means, such as retaining plates or snap rings.

A feature of this invention is the dual function of the backing plate to support the bristles and transmit the axial loads.

A further feature of this invention is the diametral fit between the brush seal package side plate and the carrier that eliminates the need of the retaining means.

The foregoing and other features of the present invention will become more apparent from the following description and accompanying drawings.

BRIEF DESCRIPTION OF DRAWINGS

FIG. 2 is a sectional view illustrating a prior art seal of a typical brush seal package;

FIG. 3 is a sectional view illustrating the details of the brush seal package of this invention;

BEST MODE FOR CARRYING OUT THE INVENTION

Figure 1:
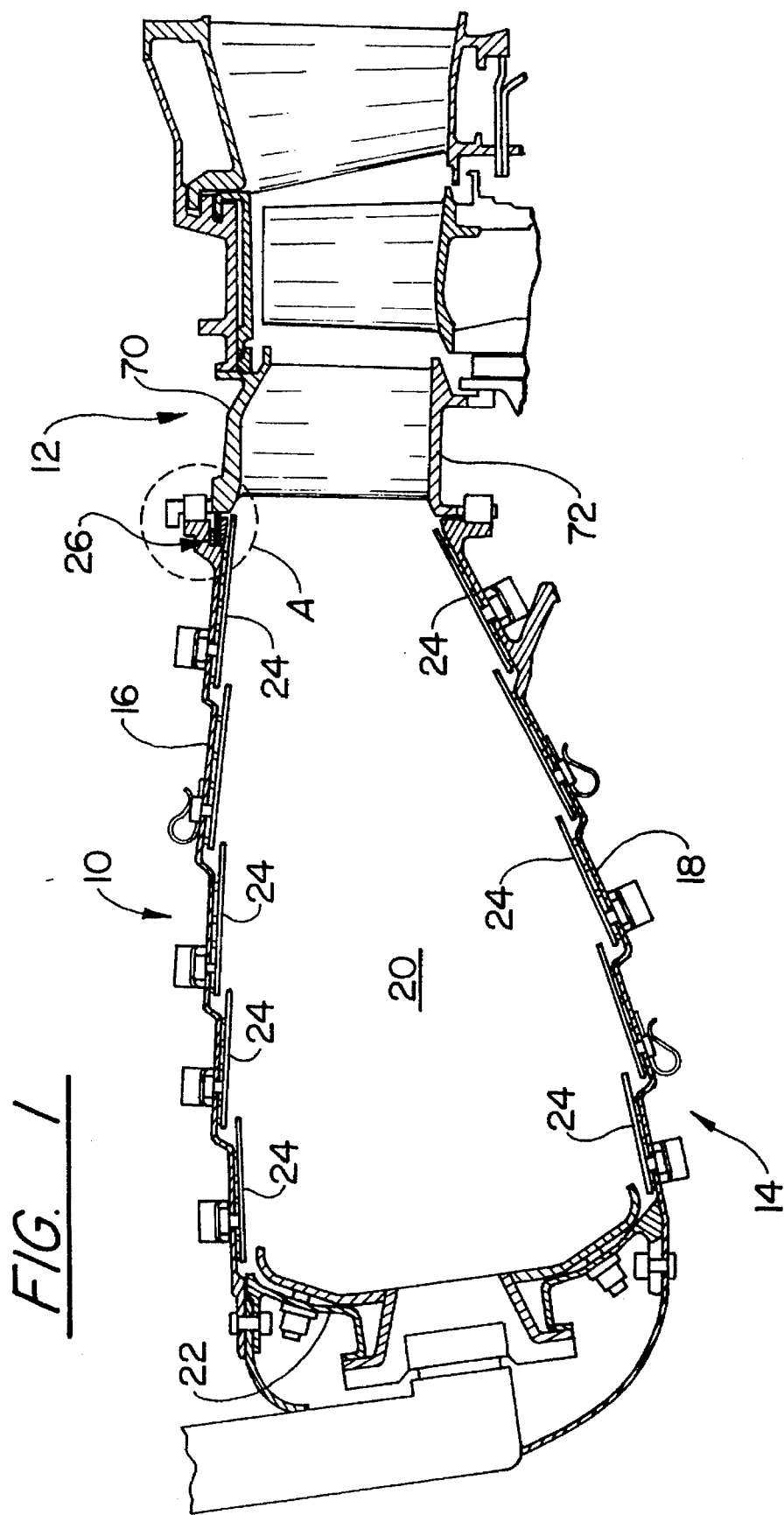
FIG. 1 is a view partly in section and partly in elevation showing the combustor and stator of a gas turbine engine and utilizing this invention at the interface.

While the brush seal is described herein in its preferred embodiment for sealing the interface of the combustor and stator of a gas turbine engine, as one skilled in this art will appreciate, this invention is capable of use in other embodiments. The invention can best be understood by referring to FIG. 1 which shows a well known annular combustor generally indicated by reference numeral 10 and the stator generally indicated by reference numeral 12 for a gas turbine engine. The annular combustor 10 includes a Floatwall liner 14 that is formed from an annular shaped outer shell 16 and an annular shaped inner shell 18 defining the annular shaped combustion chamber 20. The dome 22 fits over the forward end of the inner shell 18 and outer shell 16 enclosing the forward end and includes a plurality of fuel nozzles (one being shown) supported in circumferentially spaced apertures formed in the dome 22.

Suspended radially inward from the shells 16 and 18 are a plurality of circumferential and axially spaced segmented panels 24. The segmented panels 24 serve to shield the shells 16 and 18 from the extreme temperatures generated by the combustion of the air and fuel in the combustion chamber. The hot combustion gases combusted in the combustion chamber flow from the forward end to the rear end and exit from the exhaust end of the combustor into the stator vanes supported at the end of the combustor. The invention is concerned with this interface. Obviously, as was discussed hereinabove, the hot gases create the hostile environment and the purpose of the seal at the interface is to assure that the hot gases remain confined in the gas path stream and that the cooler air surrounding the combustor is separated therefrom. The brush seal generally indicated by reference numeral 26 disposed at the interface in the area depicted by the reference letter A serves this purpose.

To best understand this invention reference in now being made to the prior art brush seal design depicted in FIG. 2. The typical brush seal consists of backing plate 40, a plurality of bristles 42 (individual thin cylindrically shaped flexible and resilient strands or fibers of either metal or composite material) and the side plate 44. These three components are welded together by weldment 46 to form an integral brush seal package. A typical and suitable carrier generally illustrated by reference numeral 48 consisting of an annular plate 50 and annular support member 52 are bolted together by a plurality of bolts or rivets 54. The space between the end of plate 50 and the upper end of support member 52 secure the bristle pack and support it to be radially positioned in sealing relationship (not shown).

As noted in the embodiment in FIG. 3 and accordance with this invention, the brush seal package 26 consisting of backing plate 60, side plate 62 and bristles 64 (of the type described in connection with the prior art bristles) are suitably bonded together as by welding or braising and define a ring with the bristles oriented axially. The brush seal package 26 is dimensioned so that it forms a diametral tight fit with the inner diameter of the combustor element 66. Preferably, the fit is between 0.010–0.020 inch which is sufficient to secure the bristle pack in place and eliminate the need of snap rings or retaining plates of the type depicted in the prior art brush seal of FIG. 2.

Figure 4:
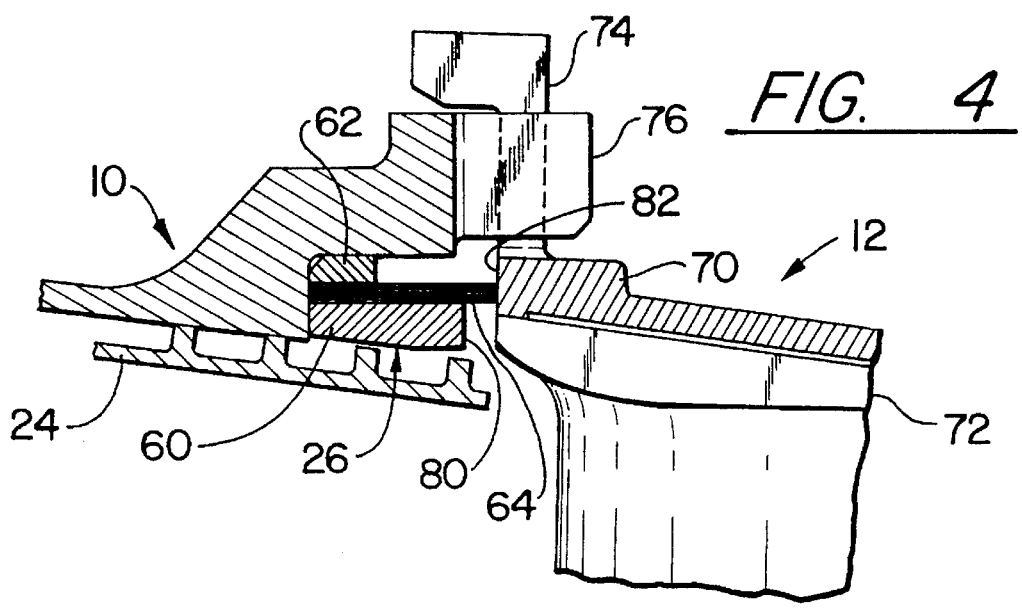
FIG. 4 is a partial view partly in section and partly in elevation illustrating the assembled brush seal.
Figure 5:
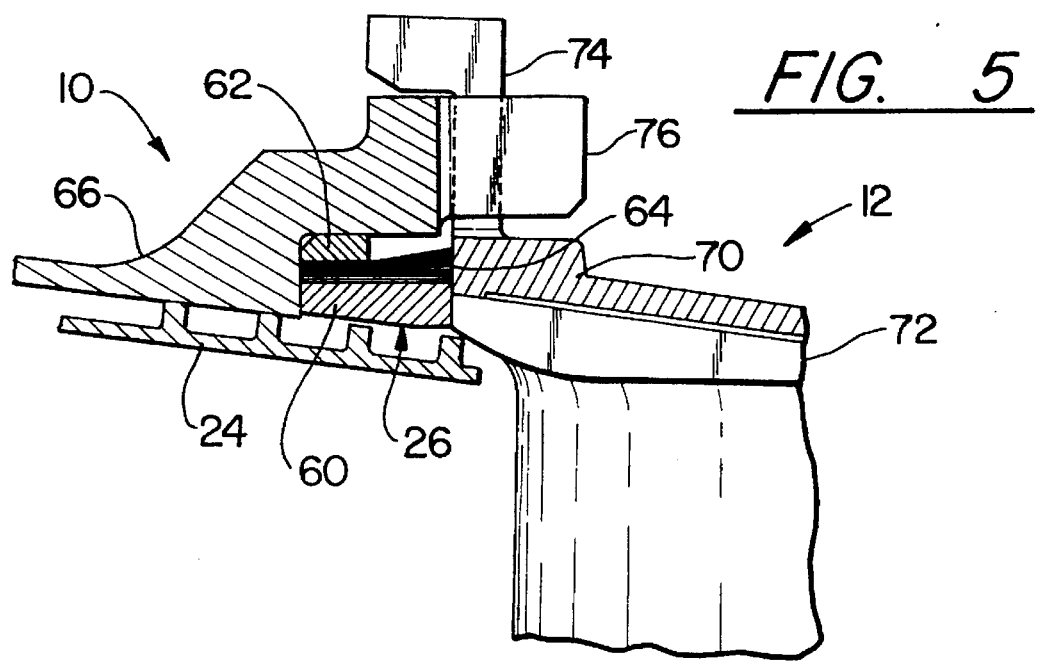
FIG. 5 is a view identical to the embodiment in FIG. 4 illustrating the brush seal in Operation.
Figure 6:
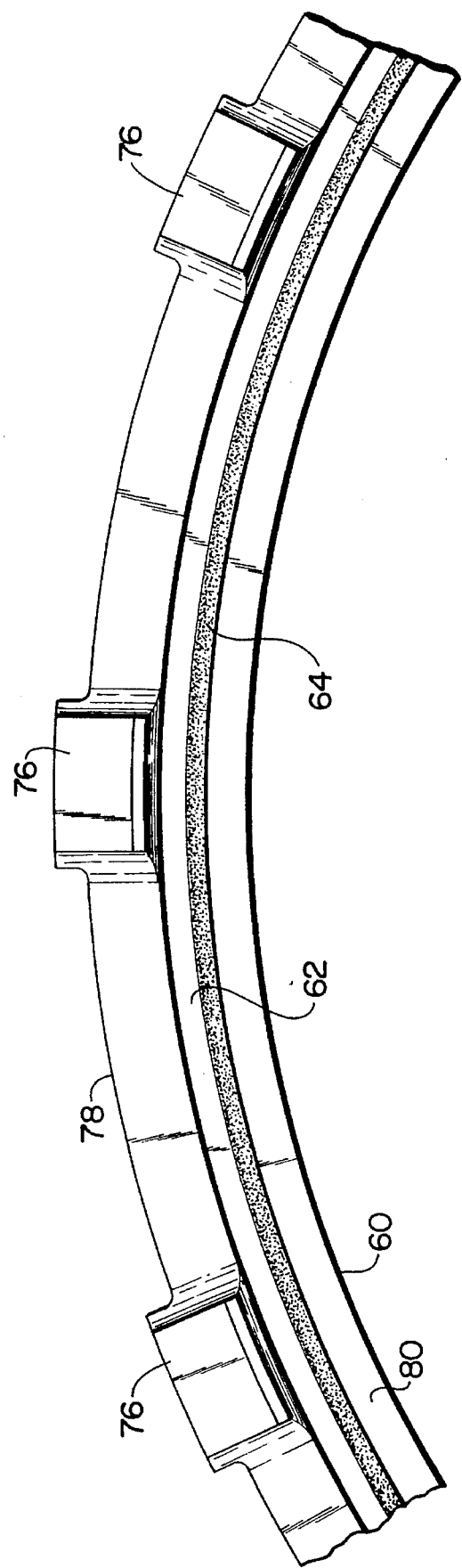
FIG. 6 is a partial end view of the combustor liner looking in the fore direction to illustrate the stator vane support structure.

FIGS. 1, 4, 5 and 6 illustrate the brush seal of this invention assembled and in operation. As can be seen in these FIGS., the outer platform 70 of stator vane assembly 72 carries an outwardly projecting bifurcated support arm 74 which engages lugs 76 formed on the end of the support element 66 bonded to the shell 16 at the end to the combustor 10. The brush seal 26 is sandwiched between the rearwardly mounted end segmented plates 24 and the support element 78. And as seen in FIG. 4, when assembled the end of bristles just bear against the end face 82 of outer platform 70. During operation and as the combustion gases heat the component parts, the combustor expands axially so that the brush seal package is urged to place the face 80 at the edge of the backing plate 60 in contact with the front face 82 of the edge of the outer platform 70. In this manner the axial loads are transmitted from the combustor to the stator through the backing plate 60, the load imposed on shoulder 84 of support element 66, through the support element 66 and through the combustor shell 16.

What has been shown by this invention is a uncomplicated sealing arrangement for the interface of the combustor and first stage turbine stator assembly in a gas turbine engine. Employing a diametral tight fit eliminates the necessity of snap rings, retaining plates or other retaining mechanism for the brush seal. The brush seal package by being mounted axially rather than radially as in heretofore designs, through the backing plate serves the dual function of retaining the pack of bristles and transmits the axial load.

Although this invention has been shown and described with respect to detailed embodiments thereof, it will be appreciated and understood by those skilled in the art that various changes in form and detail thereof may be made without departing from the spirit and scope of the claimed invention.

I claim:

1. A brush seal for sealing and transmitting axial loads comprising an annular shaped backing plate, a co-axially disposed and parallelly spaced side plate, and a bundle of axially extending flexible and resilient bristles extending beyond the back plate and flush at the remote end of said bristles with the edge faces of said side plate and said back plate, said bundle of axially extending flexible and resilient bristles being disposed between said side plate and said back plate, said back plate axially extending beyond said side plate for transmitting axial loads from one location adjacent the remote end of said bristles to another location, and said back plate bears against said one location and said another location to transmit axial loads.

2. A brush seal as claimed in claim 1 wherein said backing plate, said bristles and said side plate are bonded to form an integral annular brush seal package.

3. For a gas turbine engine including an annular combustor and an adjoining stator assembly disposed at the axial end of said annular combustor, said combustor including an annular shaped support element at said axial end, said support element having a depending shoulder disposed on the inner diameter of said annular support element, said stator assembly including an outer platform, said outer platform having a forward facing edge having a frontal face, a brush seal package disposed in said inner diameter of said annular shaped support element and bearing against said depending shoulder, said brush seal package including an annular shaped backing plate, a side plate co-axially and concentrically disposed relative to said backing plate and defining an annular space therebetween, a plurality of flexible and resilient bristles having one end disposed beyond said backing plate and bearing against said frontal face and being in a sealing relationship therewith and the other end flushly mounted relative to the edge faces of said backing plate and said side plate which the edge faces bear against said shoulder, said side plate and said inner diameter of said support element being in a diametrical tight fit relationship, said support element of said combustor including a plurality of circumferentially spaced lugs being disposed in the axial direction, said outer platform including an arm extending radially outward from the outer diameter of said outer platform of said stator assembly and engaging said lugs to support said stator assembly, and said bristles being deployed upon expansion of said annular combustor such that said backing plate is capable of transmitting axial loads encountered by said combustor.

4. For a gas turbine engine as claimed in claim 3 including a liner connected to said support element, said liner including an outer cylindrical shaped shell and a plurality of segmented plates axially and circumferentially supported to said shell defining a combustion chamber, the most rearwardly mounted plates extending underneath said backing plate.

* * * * *